Nov. 12, 1940.　　　　F. S. STICKNEY　　　2,221,618

LAMINATED MAGNET

Filed July 16, 1938

WITNESSES:
Leon M. Harman
C. L. Freedman

INVENTOR
Fernald S. Stickney.
BY
ATTORNEY

Patented Nov. 12, 1940

2,221,618

UNITED STATES PATENT OFFICE 2,221,618

LAMINATED MAGNET

Fernald S. Stickney, Verona, N. J., assignor to Westinghouse Electric & Manufacturing Company, East Pittsburgh, Pa., a corporation of Pennsylvania Application July 16, 1938, Serial No. 219,514

5 Claims. (Cl. 175—21)

This invention relates to magnets and to the method of making the same, and it has particular relation to laminated permanent magnets suitable for use in electrical instruments.

Permanent magnets heretofore employed in electrical instruments generally are formed from a single piece of permanent magnet steel such as chromium, tungsten or cobalt steel. To the ends of this permanent magnet pole pieces of soft steel ordinarily are attached by means of resistance welding. The purpose of these pole pieces is to distribute the magnetic flux uniformly between the poles of the permanent magnet. If the ends of the permanent magnet were employed as pole pieces, the magnet flux in the air gap would be irregular because of the formation of local magnetic poles in the hardened steel ends of the permanent magnets.

Because of their simplicity and ease of manufacture, laminated magnets have been found desirable for some applications. As a result of difficulties encountered in attaching pole pieces by resistance welding due to warping and other troubles, laminated magnets have been employed without pole pieces. Such magnets are not satisfactory for use in precision instruments because of the action of the local magnetic poles above referred to. In other applications of laminated magnets, pole pieces have been attached to the permanent magnet by means of bolts, but such means of attachment do not permit of precision milling and machining of the pole pieces to accurate dimensions.

In accordance with my invention, pole pieces are attached to a single lamination of a laminated assembly, the remaining laminations being free relative to the pole pieces. Because of this construction each lamination may be finished independently of the remaining laminations and subsequently assembled to produce a finished magnet.

It is, therefore, an object of my invention to secure pole pieces rigidly to a laminated magnet assembly.

It is another object of my invention to provide a laminated permanent magnet wherein a pole piece is attached to only one of the laminations.

It is a further object of my invention to provide a method for attaching pole pieces to a laminated magnet.

Other objects of my invention will be apparent from the following description taken in conjunction with the accompanying drawing, in which.

Figure 1:
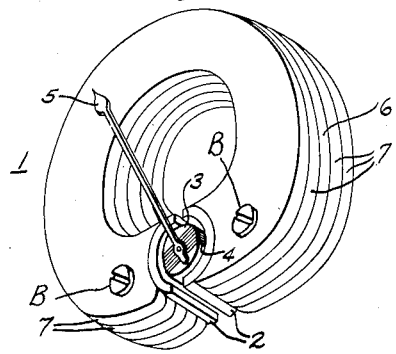
Figure 1 is a view in perspective of an electrical instrument having a permanent magnet designed in accordance with my invention.
Figure 2:
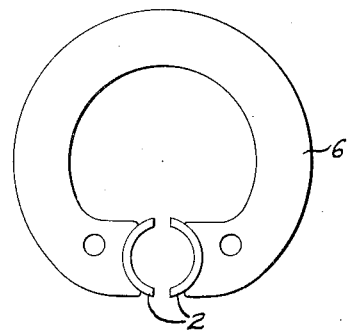
Fig. 2 is a detailed view in plan of one of the laminations shown in Fig. 1, together with the pole pieces.

Referring to the drawing, Fig. 1 shows an instrument of the D'Arsonval type comprising a permanent magnet 1 having pole pieces 2 and a magnetic core 3. In the gap provided between the pole pieces 2 and the magnetic core 3 a coil 4 carrying a pointer 5 is mounted for rotation on pivots (not shown). As is customary in instruments of this type, an electrical current is passed through the coil 4 which rotates against the resistance of a spring (not shown) to a position dependent upon the magnitude of the current passing through the coil. The movement of the pointer 5 ordinarily is indicated by means of a scale (not shown). Instead of the solid section permanent magnet usually employed for D'Arsonval instruments, I have illustrated in Fig. 1 a permanent magnet made up of five laminations.

In order to attach the pole pieces 2 to the permanent magnet assembly, a central supporting lamination 6 is affixed to the pole pieces in any suitable way, preferably by a fused, integral metallic bond such as soldering, brazing or resistance welding. The remaining laminations 7 have recesses formed therein of such size that they may be slipped over the pole pieces 2 into contact with the supporting lamination 6 in which position they may be secured in any suitable manner as by bolts B.

Although the steps of assembling the component parts of the permanent magnet may be varied appreciably, I prefer to harden the lamination 6 prior to attachment of the pole pieces thereto. After attachment of the pole pieces they may be machined to the proper dimensions after which the assembly comprising the lamination 6 and pole pieces 2, if desired, may be electroplated or coated with a cellulose lacquer or any other suitable varnish or protective coating to guard against corrosion thereof. Each of the laminations 7 preferably is hardened and finished similarly prior to assembly on the lamination 6. Assuming that all of the laminations are constructed from permanent magnet steel, variation in magnetic properties of the steel due to the heat generated during the attaching operations and during the machining operations is confined to small portions of a single lamination 6, and the remaining laminations 7 are not affected in any way by the pole piece attaching and machining operations.

Figure 4:
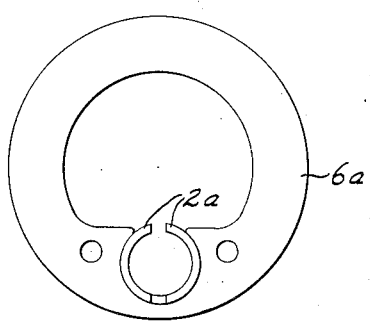
Figs. 4, 5 and 6 are views showing modifications of the structure shown in Fig. 2.
Figure 3:
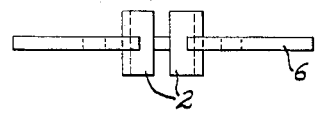
Fig. 3 is a view in elevation of the structure shown in Fig. 2.
Figure 6:
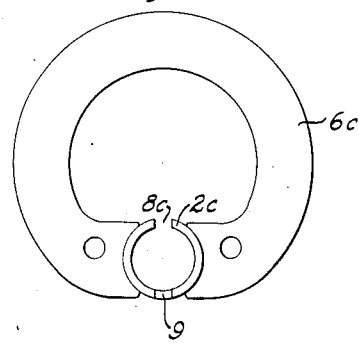

Usually the lamination 6 possesses sufficient rigidity to maintain the pole pieces 2 accurately in a predetermined position, but if a further support for the pole pieces is desired, one of the modifications shown in Figs. 4 to 7 may be adopted. In Fig. 4, the lamination 6 is replaced by a continuous lamination 6a having a recess suitable for receiving pole pieces 2a. As shown in Fig. 4, the lamination 6a is continued beneath the pole pieces 2a to provide additional support therefor. If made of magnetic material, this continuation of the lamination will act as a shunt across the pole pieces, but the decrease in flux due to the action of the shunt will not be large enough to preclude its use.

Figure 5:
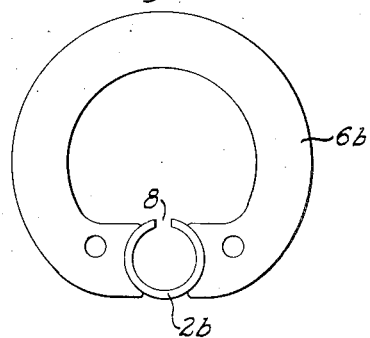
Figure 7:
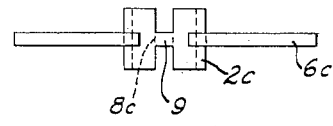
Fig. 7 is a view in elevation of the structure shown in Fig. 6.

Fig. 5 shows a further modification wherein the lamination 6 is replaced by a lamination 6b between the ends of which a cylinder of soft steel 2b is placed. The cylinder is provided with a notch 8 in order to provide two pole piece portions. Here again the continuation of the pole pieces between the ends of lamination 6b results in a decrease in flux in the air gap because of the shunt action of the continuation, but sufficient flux is present in the air gap for many instrument applications. This shunt action may be decreased appreciably by adopting the modification shown in Figs. 6 and 7, wherein a soft steel cylinder 2c is mounted between the ends of a supporting lamination 6c. As in Fig. 5, the soft steel cylinder 2c is provided with a notch 8c in order to provide two pole piece sections. The opposite side of the cylinder is also cut away by one or more notches to leave a small tie 9 for further supporting the pole pieces. Because of its small size, this tie does not appreciably decrease the flux present in the air gap between the pole faces of the permanent magnet assembly.

Many modifications of the structures thus far described are possible. For example, instead of a uniform thickness of the laminations 6 and 7, the laminations may vary in thickness. Thus a thicker lamination 6 may be employed for supporting the pole pieces 2 if greater rigidity is desired. Instead of attaching the pole pieces to a single lamination, they may be attached to more than one lamination in order to secure greater rigidity. That is, two adjacent laminations may be resistance welded, soldered or brazed to the pole pieces 2. Preferably, the supporting lamination 6 is centrally located, but any of the other laminations may be employed as the supporting member for the pole pieces.

Ordinarily the laminations all will be formed from permanent magnet steel. Since the heating resulting from the attaching and machining operations is confined to the tips of a single lamination 6, very little loss in the magnetic properties of the resulting permanent magnet will be noticed. In some cases, however, it may be desirable to employ a non-magnetic supporting lamination 6 for the pole pieces 2, such as brass.

One of the advantages flowing from my invention is that the number of laminations may be varied as desired without any variation in manufacturing procedures. For example, if a weaker magnet suffices, one or more of the laminations 7 may be omitted, thereby providing a weaker magnet without requiring any increase in manufacturing operations or stock of parts. If a standard thickness is required, the omitted laminations 7 may be replaced by non-magnetic laminations of brass or other material.

Since my invention is susceptible to numerous modifications, I do not desire to be restricted to the specific embodiments disclosed. Therefore, my invention is to be restricted only by the appended claims as interpreted in view of the prior art.

I claim as my invention:

1. The method of constructing a laminated magnet which comprises forming a plurality of magnetic laminations, hardening one of said laminations, integrally bonding a pole piece to each of two mutually facing pole faces of said one lamination by a fused metal bond, machining said pole pieces, hardening the remainder of said laminations, and assembling said remainder of said laminations on said one hardened lamination.

2. The method of constructing a laminated magnet which comprises forming a plurality of magnetic laminations, hardening one of said laminations, securing a pole piece to said one hardened lamination, machining said pole piece, forming a protective coat on said one hardened lamination, hardening the remainder of said laminations, forming a protective coat on said remainder of said laminations, and assembling said remainder of said laminations on said one hardened lamination.

3. In a permanent magnet assembly, a pair of magnetic pole-piece members having arcuate surfaces for defining a substantially cylindrical air gap, a plurality of permanent magnet laminations of substantially similar shape and size having opposed pole faces substantially abutting said pole-piece members, said permanent magnet laminations being stacked with the axis of said substantially cylindrical air gap substantially perpendicular to the plane of the meeting faces of adjacent permanent magnet laminations, said pole-piece members being attached by an integral, fused metallic bond to the opposed pole faces of part only of the full number of said laminations, and means independent of said pole-piece members for uniting all of said laminations, said last-named means constituting the only means for uniting all of said laminations.

4. In a permanent magnet assembly, a first permanent magnet lamination having spaced, opposed, first pole faces, a pair of magnetic pole members positioned between said pole faces and each attached to one of said opposed pole faces of said lamination by an integral fused metallic bond, each of said pole members abutting a separate one of said opposed, first pole faces, and a second permanent magnet having spaced, opposed second pole faces substantially similar in spacing to said first pole faces, said laminations being positioned in side-by-side relationship with said second pole faces forming substantially extensions of said first pole faces, and said pole members slidably extending between said opposed, second pole faces, and means independent of said pole members for securing said laminations to each other, said last-named means constituting the only means for securing said laminations together.

5. In a permanent magnet assembly, a pair of magnetic pole-piece members having surfaces for defining an air gap, a plurality of U-shaped permanent magnets assembled in side-by-side relationship, each of said permanent magnets having opposed pole faces substantially abutting said pole-piece members for producing magnetic flux in said air gap, said pole-piece members being attached to the abutting opposed pole faces of part only of said permanent magnets by an integral fused metallic bond, and means independent of said pole piece members for securing said magnets to each other.

FERNALD S. STICKNEY.